(12) United States Patent
Moon et al.

(10) Patent No.: US 8,785,016 B2
(45) Date of Patent: Jul. 22, 2014

(54) BATTERY PACK

(75) Inventors: Dae-Yon Moon, Yongin-si (KR); Sang-Hun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 13/345,554

(22) Filed: Jan. 6, 2012

(65) Prior Publication Data

US 2012/0214026 A1 Aug. 23, 2012

(30) Foreign Application Priority Data

Feb. 17, 2011 (KR) .................... 10-2011-0014138

(51) Int. Cl.
*H01M 2/00* (2006.01)
*H01M 10/48* (2006.01)

(52) U.S. Cl.
USPC .............................................. 429/61; 429/90

(58) Field of Classification Search
None
See application file for complete search history.

(56) References Cited

U.S. PATENT DOCUMENTS

| 6,600,525 | B1 * | 7/2003 | Sawai et al. .................. 349/58 |
| 2007/0196729 | A1 * | 8/2007 | Yamauchi et al. ............ 429/130 |
| 2008/0160400 | A1 | 7/2008 | Oh | |
| 2009/0027218 | A1 | 1/2009 | Yoo | |

FOREIGN PATENT DOCUMENTS

| JP | 05-053123 U | 7/1993 |
| JP | 2010-225516 | 10/2010 |
| KR | 10-2001-0092814 A | 10/2001 |
| KR | 10-2002-0039001 A | 5/2002 |
| KR | 10-0515781 B | 9/2005 |
| KR | 10-2006-0102208 A | 9/2006 |
| KR | 10-2008-0087959 A | 10/2008 |
| KR | 10-2009-0030818 | 3/2009 |

OTHER PUBLICATIONS

KIPO Office action dated Jul. 23, 2012, for Korean priority Patent application 10-2011-0014138, (4 pages).
Korean Office Action dated Jan. 31, 2013 issued in Korean Patent Application No. 10-2011-0014138, 5 pages.
Patent Abstracts of Japan, and English machine translation of Japanese Publication 2010-225516 listed above (21 pages).

* cited by examiner

*Primary Examiner* — Cynthia K. Walls
(74) *Attorney, Agent, or Firm* — Christie, Parker & Hale, LLP

(57) ABSTRACT

A battery pack includes a core pack including a unit cell; a protection circuit module electrically connected to the core pack and including a switch contact portion; a frame accommodating the core pack and the protection circuit module; and a cover including a recessed portion covering at least a part of the core pack, facing the switch contact portion, and extending toward the protection circuit module.

18 Claims, 13 Drawing Sheets

BATTERY PACK

CROSS-REFERENCE TO RELATED APPLICATION

This application claims priority to and the benefit of Korean Patent Application No. 10-2011-0014138, filed in the Korean Intellectual Property Office on Feb. 17, 2011, the entire content of which is incorporated herein by reference.

BACKGROUND

1. Field

One or more embodiments of the present invention relate to a battery pack, and more particularly, to a structure of a battery pack.

2. Description of Related Art

The supply of portable computers that are operable by using a battery without an external power supply is quickly increasing, owing in part to the development of wireless Internet and communication technologies. In general, portable computers have excellent mobility since portable computers are small and easy to carry around, and thus are widely used for business or personal use. Portable computers may include a built-in battery pack so as to be freely used in various places without an external power supply. Also, a built-in battery pack may include a secondary battery that is repeatedly charged and discharged.

When power is not supplied from an external power supply, and an electrical apparatus is operated only by using a battery, the battery capacity should be checked at the beginning of the operation in order to determine whether or not the electrical apparatus can be operated due to a lack of the battery capacity during the operation of the electrical apparatus. In particular, a problem with typical portable computers is that certain keys should be pressed or certain icons should be selected when the computer is being booted in order to check a remaining charge amount of a battery.

Further, when switches for checking a remaining charge amount of a battery are out of alignment, a signal for checking a remaining charge amount of a battery is not correctly applied. Thus, an exact value cannot be obtained. Also, when an excessive force is applied, a switch may be damaged or become separated.

SUMMARY

Aspects of embodiments of the present invention are directed toward a battery pack that includes a switch capable of mitigating an excessive pressure applied to the battery pack and that may prevent movement of a protection circuit module due to pressing of the switch.

Additional aspects will be set forth in part in the description which follows and, in part, will be apparent from the description, or may be learned by practice of the presented embodiments.

According to one or more embodiments of the present invention, a battery pack includes a core pack including a unit cell; a protection circuit module electrically connected to the core pack and including a switch contact portion; a frame accommodating the core pack and the protection circuit module; and a cover including a recessed portion covering at least a part of the core pack, facing the switch contact portion, and extending toward the protection circuit module.

The frame may include a switch unit corresponding to the switch contact portion.

The switch unit may include: a first protrusion extending toward the switch contact portion; and a second protrusion spaced apart from the first protrusion at an interval.

The second protrusion may surround the first protrusion.

A height of the second protrusion may be equal to or greater than a height of the first protrusion.

The protection circuit module may include a projection corresponding to the second protrusion.

The second protrusion may further include an elastic portion at an end portion thereof.

The first protrusion may further include an elastic portion at an end portion thereof.

A groove may be formed in the protection circuit module so as to accommodate the second protrusion.

The cover may include: a first cover located at a first side of the frame; and a second cover located at a second side of the frame.

A recessed portion extending toward the protection circuit module may be formed in the first cover so as to correspond to the switch contact portion, and an aperture is formed in the second cover so as to correspond to the switch unit.

The protection circuit module may include a substrate, where a first end portion of the substrate is supported by the frame, and a second end portion of the substrate is supported by the recessed portion of the cover.

A width of the recessed portion may be equal to or greater than a thickness of the substrate.

An end portion of the recessed portion may include a first supporting frame and a second supporting frame, and the substrate may be located between the first supporting frame and the second supporting frame.

The battery pack may further include an insulating member located between the core pack and the cover.

The frame may include a high molecular weight compound.

The cover may include a metal.

The cover may include stainless steel.

The battery pack may further include a display unit for displaying a state of the core pack.

The unit cell may be a polymer-type battery.

The battery pack may be used in a portable computer.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
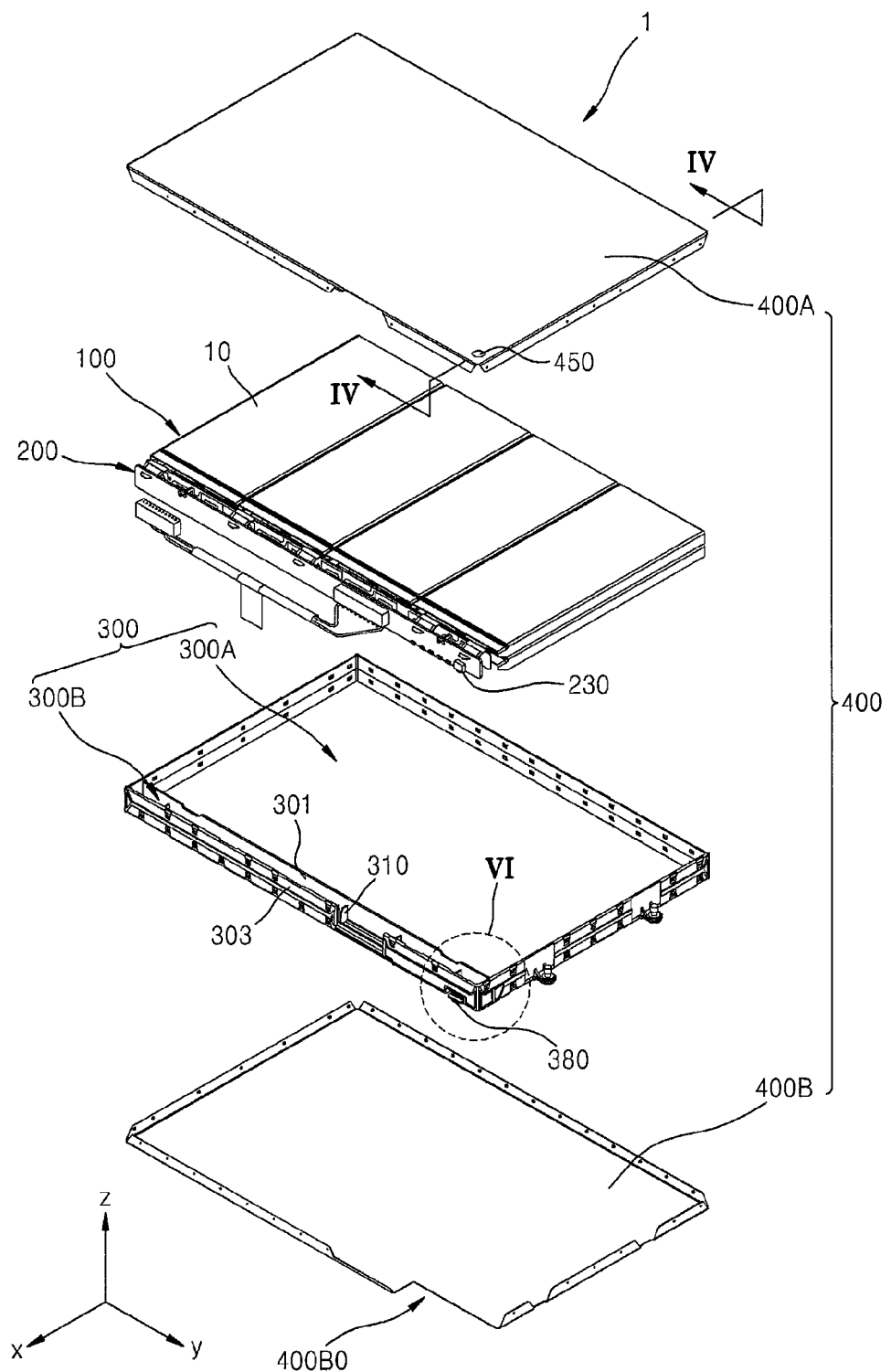
FIG. 1 is a schematic exploded perspective view of a battery pack according to an embodiment of the present invention.

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Further, like reference numerals designate like elements throughout the specification.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

Figure 2A:
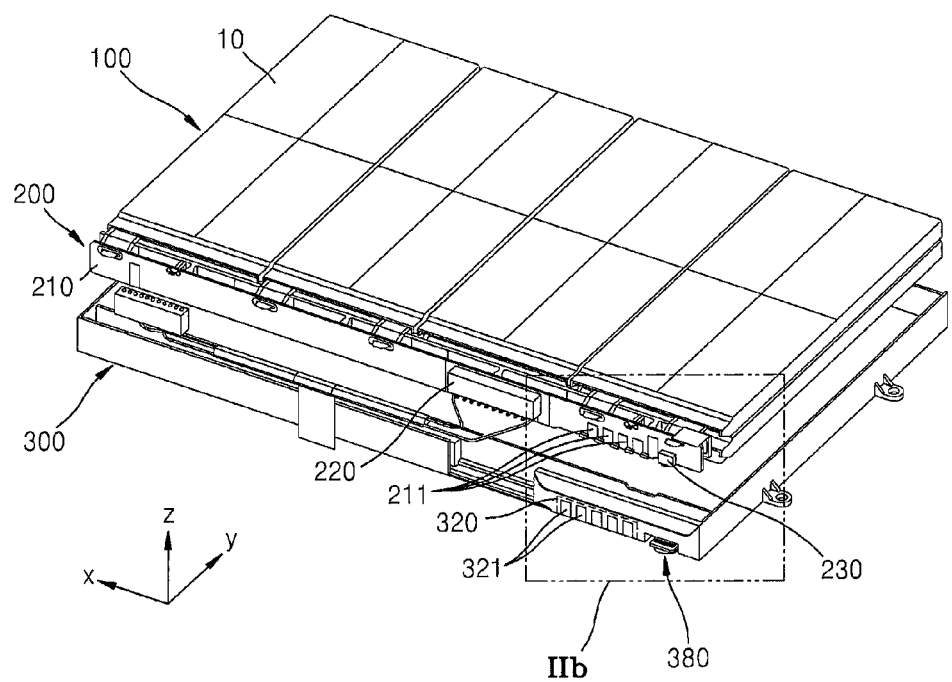
FIG. 2A is a schematic exploded perspective view of the battery pack of FIG. 1 in which some of the components are assembled together.
Figure 2B:
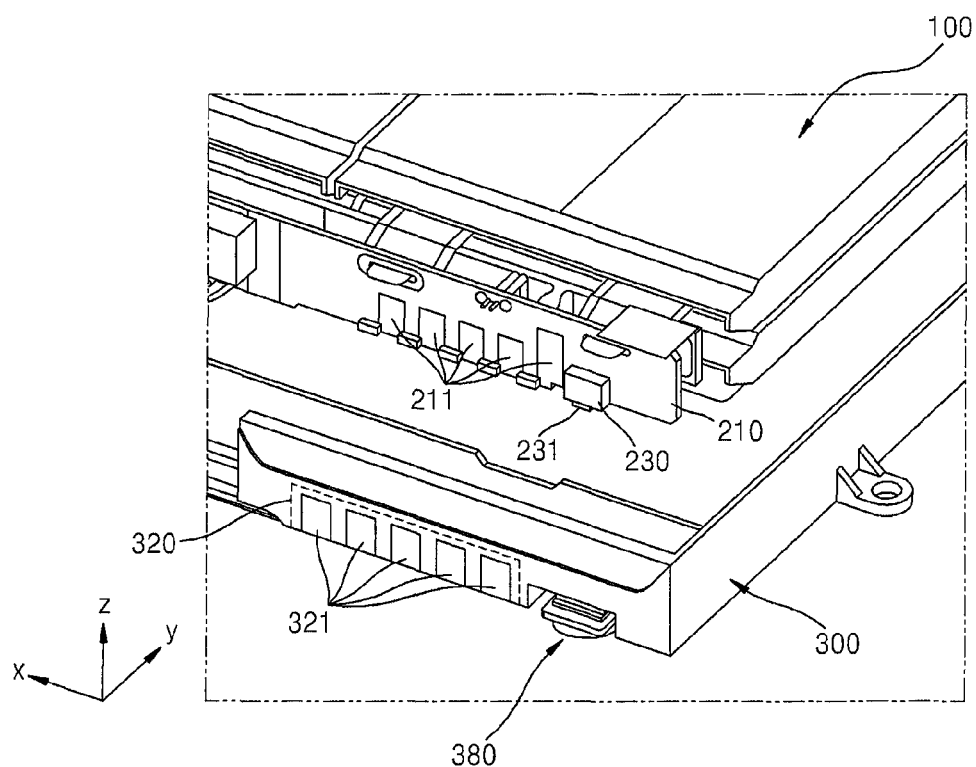
FIG. 2B is a schematic perspective view of part IIb of FIG. 2A.

FIG. 1 is a schematic exploded perspective view of a battery pack 1, according to an embodiment of the present invention. FIG. 2A is a schematic exploded perspective view of the battery pack 1 of FIG. 1 in which some of the components are assembled together. FIG. 2B is a schematic perspective view of part IIb of FIG. 2A.

Referring to FIGS. 1, 2A, and 2B, the battery pack 1 includes a core pack 100, a protection circuit module 200, a frame 300, and a cover 400.

The core pack 100 includes a rechargeable unit cell 10. In one embodiment, the core pack 100 includes two or more unit cells 10. The unit cell 10 may be a secondary battery. For example, the unit cell 10 may be a lithium secondary battery or a polymer-type battery. In one embodiment, a plurality of unit cells 10 are connected to one another in series and/or in parallel to configure the core pack 100. Referring to FIG. 1, the core pack 100 includes eight unit cells 10. In FIG. 1, the core pack 100 includes four pairs, each pair including two unit cells 10 that are connected to each other in parallel, wherein the four pairs are connected to each other in series. However, the number and the method of connecting the unit cells 10 are not limited to the illustrated embodiment, and thus the number and the method of connecting the unit cells 10 may be modified in various ways. The core pack 100 may supply power to various electronic devices. For example, the core pack 100 may supply power to a notebook computer or a power tool.

In one embodiment, the protection circuit module 200 is electrically connected to the core pack 100. For example, the protection circuit module 200 may be electrically connected to the core pack 100 by a connection tap 150. The protection circuit module 200 may prevent overheating and/or explosion from occurring due to an overcharge, overdischarge, or overcurrent state of the core pack 100. The protection circuit module 200 includes a substrate 210 located on one side of the core pack 100 and a protection device 220 mounted on the substrate 210. The protection device 220 may be selectively formed of a safety device including a passive device, such as a resistor or a capacitor, or an active device, such as a field-effect transistor (FET), or may be formed of integrated circuits. In one embodiment, the protection device 220 includes, for example, a positive temperature coefficient (PTC) device.

The frame 300 accommodates the core pack 100 and the protection circuit module 200. The frame 300 may include a first region 300A and a second region 300B. In one embodiment, the first region 300A and the second region 300B are divided by a dividing wall 301. The first region 300A and the second region 300B may accommodate the core pack 100 and the protection circuit module 200, respectively. The frame 300 may include an insulating material. For example, the frame 300 may constitute a high molecular compound that may be molded by plastic deformation using heat and/or pressure. The frame 300 including the first region 300A and the second region 300B may be formed as one body. However, the present invention is not limited thereto, and the frame 300 may be formed from a plurality of components or parts.

If the core pack 100 includes a polymer battery and the frame 300 is formed by hot injection molding by putting the pack 100 and the protection circuit module 200 in a mold, an operational problem may occur in a PTC device included in the protection circuit module 200 during the heating of the molded frame 300. However, in embodiments according to the present invention, the frame 300 is separately formed from the core pack 100 and the protection circuit module 200 and is coupled to the core pack 100 and the protection circuit module 200 after formation, and thus an operational problem does not occur in the PTC device included in the protection circuit module 200, thereby decreasing defects.

In one embodiment, a first aperture is formed in at least one of a first side surface or a second side surface in a Z-axis direction of the first region 300A. In FIG. 1, the first aperture is formed in opposite sides of the first region 300A. In one embodiment, a second aperture is formed in at least one of a first side surface and a second side surface in a Z-axis direction of the second region 300B. The second region 300B may include a space between the dividing wall 301 and one terminal 303 located to face the dividing wall 301 and may accommodate the protection circuit module 200 in the space. In one embodiment, the first region 300A and the second region 300B may be divided by the dividing wall 301. A supporting portion 310 may be formed in the second region 300B so as to support the protection circuit module 200.

The cover 400 accommodates the core pack 100 and may be coupled to the frame 300. In one embodiment, the cover 400 is formed of a metal so as to decrease a thickness of the battery pack 1. For example, the cover 400 may be formed of stainless steel (SUS).

In one embodiment, an insulating member 500 is located between the cover 400 and the core pack 100. The insulating member 500 may be an insulating tape. The insulating member 500 may insulate the cover 400 formed of a metal and the core pack 100 from each other. The insulating member 500 may also insulate the cover 400 and the protection circuit module 200 from each other.

In one embodiment shown in FIG. 1, the cover 400 is divided into a first cover 400A and a second cover 400B. However, the present invention is not limited thereto, and the cover 400 may be integrally formed. In one embodiment, the cover 400 is formed in the form of a thin plate. When the cover 400 is formed in the form of a thin plate, the entire thickness of the battery pack 1 may be decreased.

In one embodiment, the battery pack 1 is configured to display an electrical characteristic of the core pack 100 by receiving a user's input. For example, the battery pack 1 may be configured to display a state of the core pack 100, for example, a charging time, a charging degree, a remaining charge amount, and a power source of the core pack 100. Hereinafter, for convenience of description, the battery pack 1 displaying a remaining charge amount of the core pack 100 will be described, but the present invention is not limited thereto.

A user might desire to check an electrical state or a charge amount of the battery pack 1 when using the battery pack 1. In one embodiment, the battery pack 1 displays a charge amount of the core pack 100 without an additional device. For example, in a case of a portable computer, there is an inconvenience that power of the portable computer with a battery should be turned on in order to check a remaining charge amount of the battery. Accordingly, when the battery pack 1 itself displays a charge amount, a user's inconvenience may be resolved.

In one embodiment as shown in FIGS. 2A and 2B, the battery pack 1 includes the core pack 100, the protection circuit module 200, a switch contact portion 230, and a switch unit 380 in order to display a charge state of a battery. In one embodiment, the switch unit 380 is located in the frame 300 and inputs an ON signal by a user's input. The switch contact portion 230 may be located in the substrate 210 and may contact the switch unit 380. In one embodiment, the switch contact portion 230 is electrically connected to the core pack 100 via the substrate 210 and various devices (not shown) mounted on the substrate 210. The switch contact portion 230 generates a starting signal for detecting a remaining charge amount of the core pack 100 by contacting the switch unit 380. Data regarding the remaining charge amount of the core pack 100 is obtained according to the detection starting signal generated by the switch contact portion 230. For example, the data regarding the remaining charge amount of the core pack 100 may be obtained by using a method that is generally used to obtain a remaining charge amount of the core pack 100.

In the current embodiment, a case where the switch contact portion 230 is mounted on the substrate 210 of the protection circuit module 200 has been described, but the present invention is not limited thereto. For example, the switch contact portion 230, a circuit (not shown) for obtaining data regarding a remaining charge amount of the core pack 100 according to a detection starting signal generated by the switch contact portion 230, and devices (not shown) may be mounted on an additional substrate (not shown).

Figure 3:
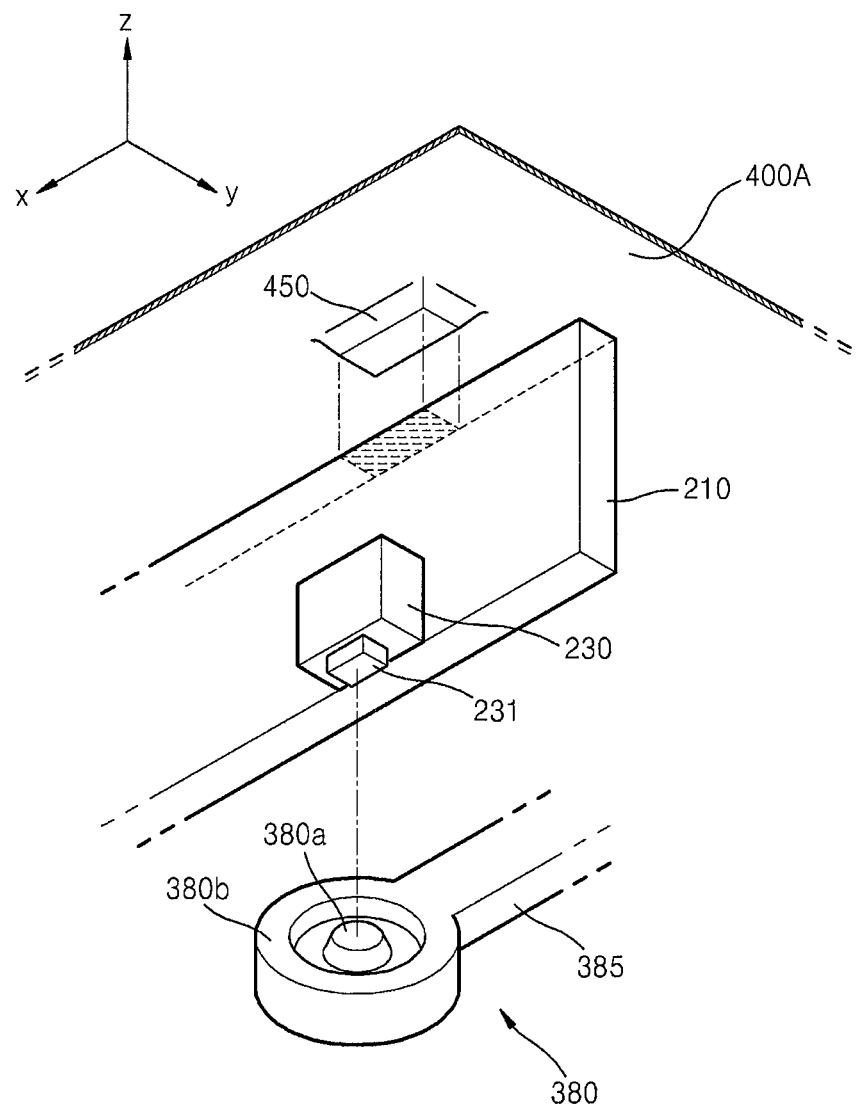
FIG. 3 is a schematic perspective view for explaining a positional relationship between a switch unit, a switch contact portion, and a recessed portion of a cover, according to an embodiment of the present invention.
Figure 4:
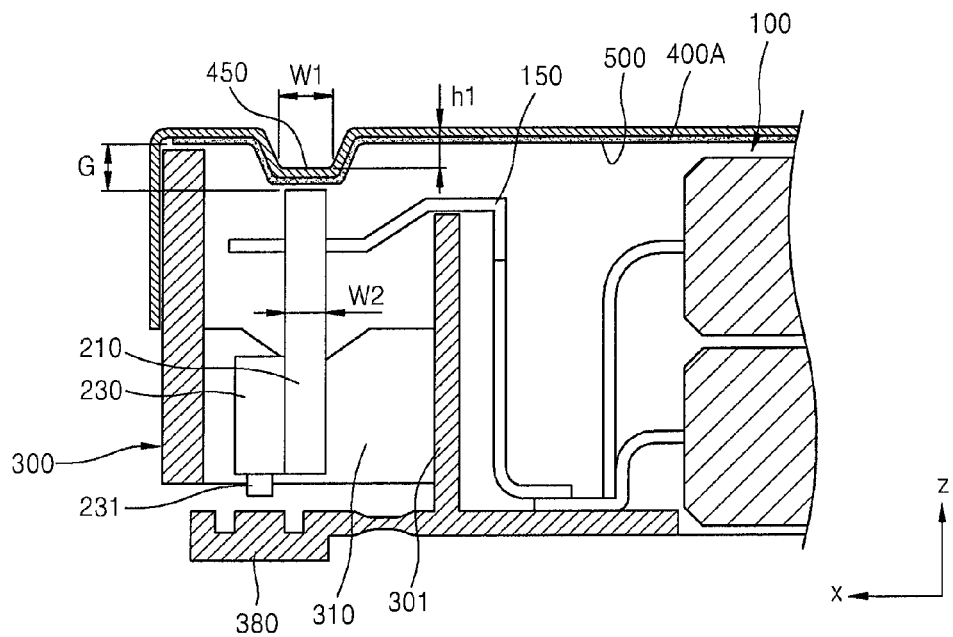
FIG. 4 is a schematic cross-sectional view taken along the line IV-IV of FIG. 1.

Hereinafter, a recessed portion 450 will be described with reference to FIGS. 3 and 4. FIG. 3 is a schematic perspective view for explaining a positional relationship between the switch unit 380, the switch contact portion 230, and the recessed portion 450 of the first cover 400A. FIG. 4 is a schematic cross-sectional view taken along the line IV-IV of FIG. 1.

In one embodiment, the switch contact portion 230 is located in the substrate 210. The switch unit 380 may be arranged to face the switch contact portion 230. If a user presses the switch unit 380 in order to check a remaining charge amount of the core pack 100, the switch unit 380 may contact the switch contact portion 230. That is, the switch unit 380 is moved in a vertical direction, that is, in a Z-axis direction, by a user, and the switch unit 380 contacts and presses the contact portion 230. An end of a switch supporting unit 385 is connected to the switch unit 380 and another end thereof is connected to the frame 300. Thus, the switch unit 380 displaced upwardly by a user may be returned to its original position by elasticity of the switch supporting unit 385.

In one embodiment, a switch button 231 is formed to protrude from a surface of the switch contact portion 230 facing the switch unit 380, so that the switch button 231 may easily contact the switch unit 380. However, the present invention is not limited thereto. For example, the switch button 231 may be formed to not protrude.

In one embodiment, the frame 300 is located to accommodate the core pack 100. The frame 300 is partially opened so as to accommodate the switch unit 380. Also, a display unit 320 is located to be exposed to the outside.

In the current embodiment, a case where a remaining charge amount of the core pack 100 is displayed has been described, but the present invention is not limited thereto. That is, in case that a charging time, a charging state, and a power source of the core pack 100 are displayed, the switch contact portion 230 may generate a starting signal for obtaining the corresponding state information, and thus the display unit 320 may display the corresponding state information, which may be derived from the above description.

As shown in FIG. 4, the substrate 210 and the first cover 400A are located to have an interval (e.g., a set or predetermined interval) G therebetween. In one embodiment, G is about 0.3 mm. In the case of a leaking core pack 100, the interval G may prevent the substrate 210 from being impregnated by an electrolyte leaking from the core pack 100 if the electrolyte flows into the substrate 210 along the first cover 400A or the second cover 400B according to an arrangement state of the battery pack 1.

However, due to the interval G between the substrate 210 and the first cover 400A, the substrate 210 may move whenever the switch unit 380 presses the switch contact portion 230. Therefore, the position of the substrate 210 may not be stably maintained due to the interval G. Also, a user may not easily press the switch unit 380 due to the interval G. In order to solve these problems, the recessed portion 450 may be formed in the first cover 400A so as to cover at least a part of the core pack 100, to face the switch contact portion 230, and to extend toward the protection circuit module 200. For example, movement of the substrate 210 may be reduced by adjusting a height h1 of the recessed portion 450. In one embodiment, an end of the substrate 210 located at an opposite side to the first cover 400A is supported by the frame 300. That is, the supporting portion 310 in the second region 300B supports an end of the substrate 210 of the protection circuit module 200, and the other end of the substrate 210 is supported by the recessed portion 450 of the first cover 400A. When the first cover 400A is formed integrally with the second cover 400B, the recessed portion 450 formed in the cover 400 supports the substrate 210. In one embodiment shown in FIG. 1, an aperture 400BO is formed in the second cover 400B located opposite the recessed portion 450 of the first cover 400A so as to correspond to the switch unit 380.

Referring to FIG. 4, a width W1 of the recessed portion 450 is equal to or greater than a thickness W2 of the substrate 210. When the width W1 of the recessed portion 450 is less than the thickness W2 of the substrate 210, the substrate 210 may slide on a lateral inclined surface of the recessed portion 450.

Figure 5:
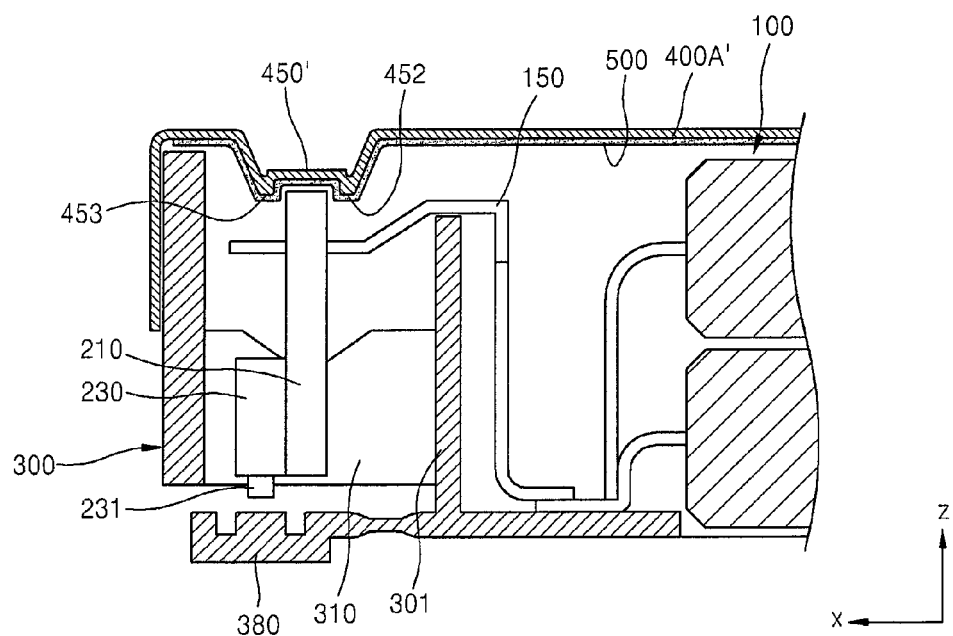
FIG. 5 is a schematic cross-sectional view taken along the line IV-IV of FIG. 1 according to another embodiment of the present invention.

A recessed portion 450' according to another embodiment will now be described with reference to FIG. 5. FIG. 5 is a schematic cross-sectional view taken along the line IV-IV of FIG. 1, according to another embodiment of the present invention.

Referring to FIG. 5, an end portion of the recessed portion 450' includes a first supporting frame 452 and a second supporting frame 453, wherein the substrate 210 is located between the first supporting frame 452 and the second supporting frame 453. Accordingly, the substrate 210 may be supported by the recessed portion 450' of the first cover 400A' so as not to slide due to a movement of the substrate 210 in the X-axis direction.

Figure 6:
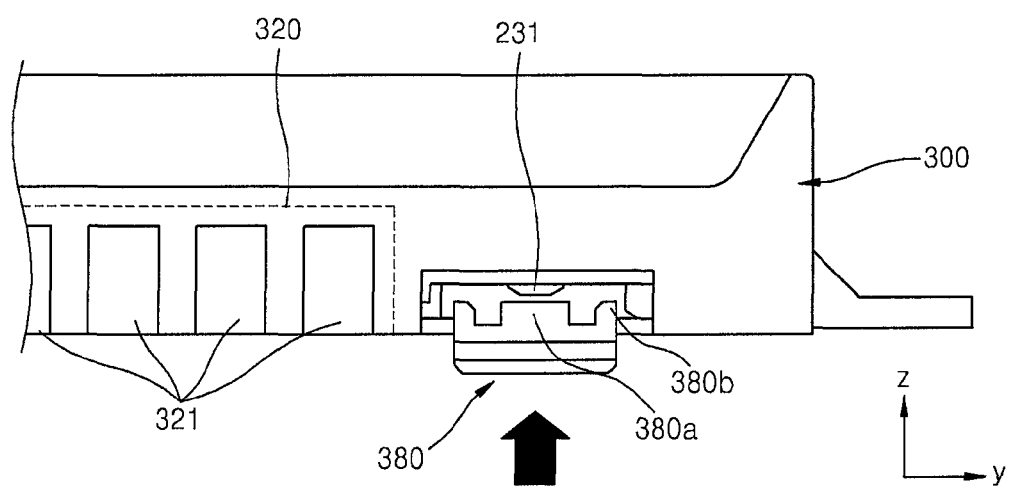
FIG. 6 is a schematic front view of part VI of FIG. 1.

Structures of the switch unit 380 and the switch contact portion 230 will now be described with reference to FIG. 6. FIG. 6 is a schematic front view of part VI of FIG. 1.

In one embodiment shown in FIG. 6, the display unit 320 displays a remaining charge amount of the core pack 100. If the switch unit 380 inputs an ON signal for displaying the remaining charge amount of the core pack 100 by contacting the switch contact portion 230, the switch contact portion 230 generates a detection starting signal as described above, and thus data regarding the remaining charge amount of the core pack 100 is obtained. The obtained data is output to a user through the display unit 320.

In one embodiment, the display unit 320 includes a plurality of light-emitting diodes (LEDs) 321. The LEDs 321 may be located to be space apart from one another at intervals (e.g., set or predetermined intervals), and may flicker according to the data regarding the remaining charge amount of the core pack 100. As shown in FIGS. 2A and 2B, the LEDs 321 are respectively located at a plurality of LED connecting units 211 formed in the substrate 210.

The remaining charge amount of the core pack 100 can be viewed by the user according to a flickering state of the plurality of LEDs 321. In one embodiment for example, it can be seen that if one LED 321 is turned on, the remaining charge amount of the core pack 100 remains about 0 to 20%. The display unit 320 is not limited thereto. The number and positions of the LEDs 321 may be modified in various ways according to designer's convenience.

In the current embodiment, a case where the display unit 320 is the LED 321 has been described, but the present invention is not limited thereto. For example, any light-emitting device capable of emitting light, for example, a small light bulb, may be used as the display unit 320.

In one embodiment, the display unit 320 includes a liquid crystal display (LCD) 322. A remaining charge amount of a battery may be output through the LCD 322, for example, in the form of a bar, symbolically or numerically. The display unit 320 may display a remaining charge amount of a battery by using various display panels such as the LCD 322 or an organic light-emitting display (OLED).

When a pressure applied to the switch unit 380 exceeds a range (e.g., a set or predetermined range), the switch button 231 may be damaged. Accordingly, there is a need to disperse a pressure applied from the switch unit 380 to the switch button 231.

Figure 7A:
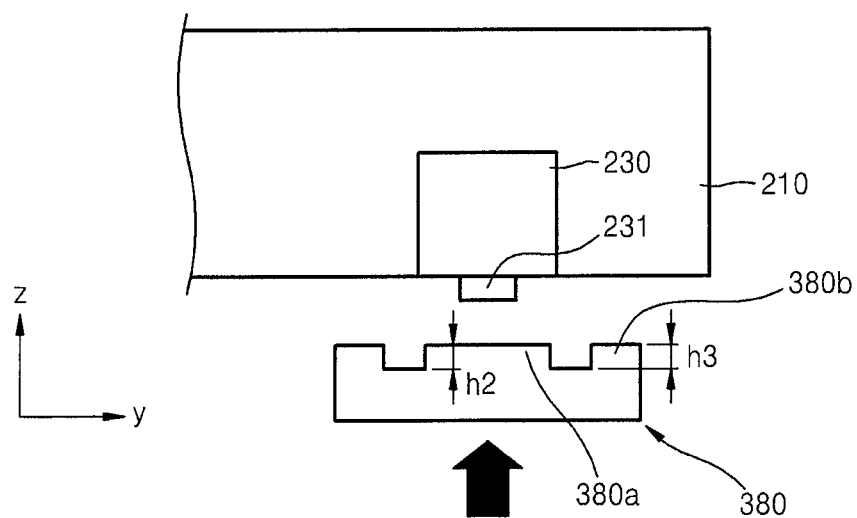
FIGS. 7A and 7B are schematic cross-sectional views for explaining operational states of a switch unit and a switch contact portion according to embodiments of the present invention.
Figure 7B:
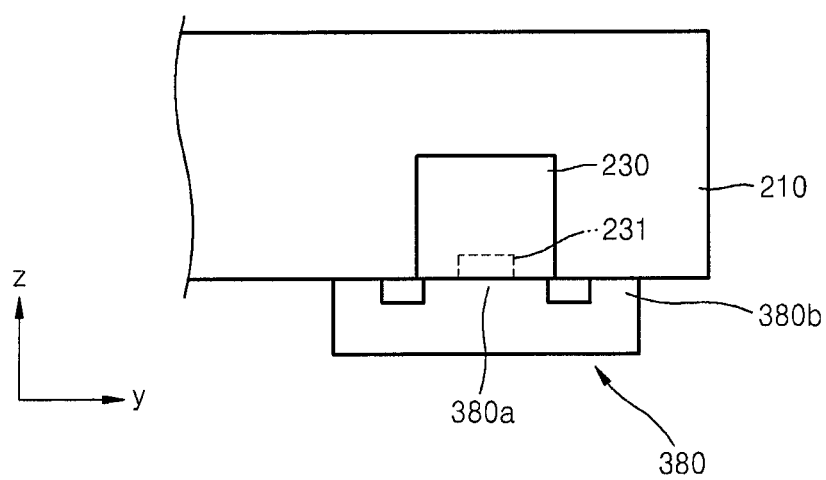

A configuration of the switch unit 380 will now be described with reference to FIGS. 7A and 7B. FIGS. 7A and 7B are schematic cross-sectional views for illustrating operational states of the switch unit 380 and the switch contact portion 230.

In one embodiment, the switch unit 380 includes a first protrusion 380a and a second protrusion 380b. The first protrusion 380a extends toward the switch contact portion 230, and the second protrusion 380b is spaced apart from the first protrusion 380a at an interval (e.g., a set or predetermined interval). Referring to FIG. 3, the second protrusion 380b is located to surround the first protrusion 380a. As seen in FIGS. 7A and 7B, a height h2 of the first protrusion 380a may be equal to a height h3 of the second protrusion 380b. Accordingly, the second protrusion 380b may disperse a pressure of the switch unit 380 in order for the first protrusion 380a not to exceed a range (e.g., a set or predetermined range) and further press the switch button 231 in a Z-axis direction.

Figure 8A:
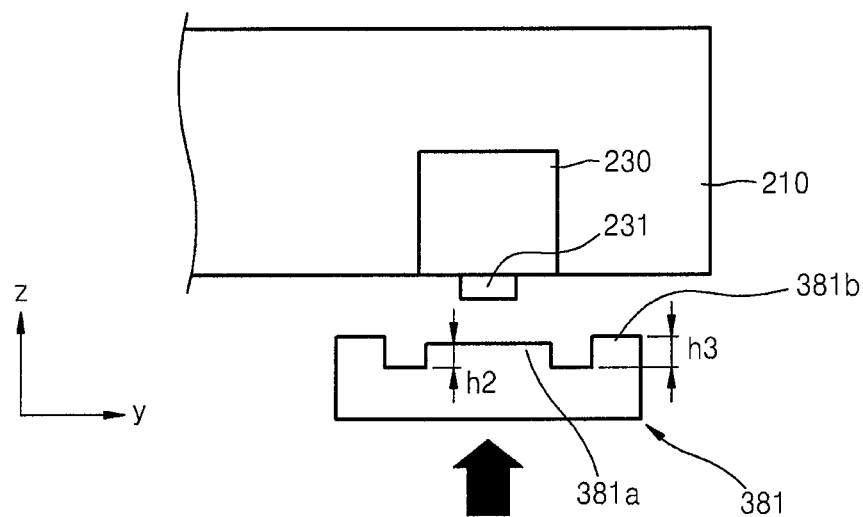
FIGS. 8A through 13B are schematic cross-sectional views for explaining operational states of a switch unit and a switch contact portion according to other embodiments of the present invention.
Figure 8B:
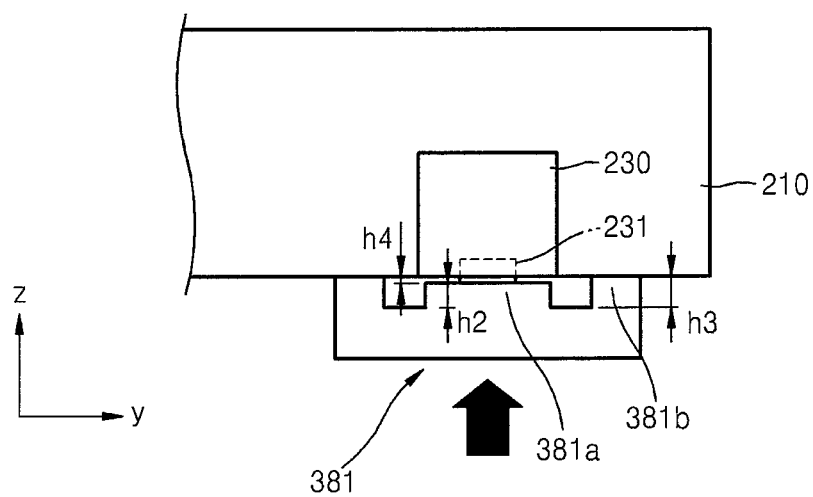

Referring to FIGS. 8A and 8B, pressing of the switch button 231 may be controlled by adjusting a difference between a height h2 of a first protrusion 381a and a height h3 of a second protrusion 381b. According to the design of the switch button 231, the switch button 231 may be designed in such a way that the switch button 231 is not completely pressed and that a predetermined height h4 remains. In this case, the height h3 of the second protrusion 381b is equal to or greater than the height h2 of the first protrusion 381a.

Figure 9A:
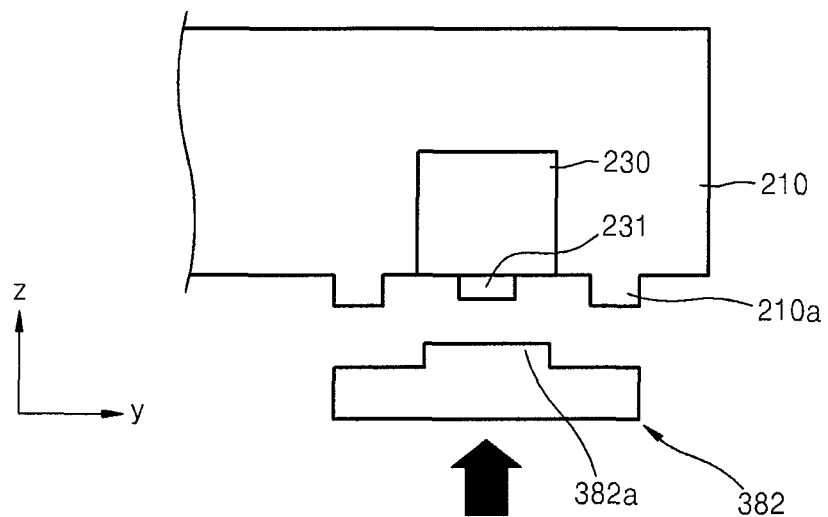
Figure 9B:
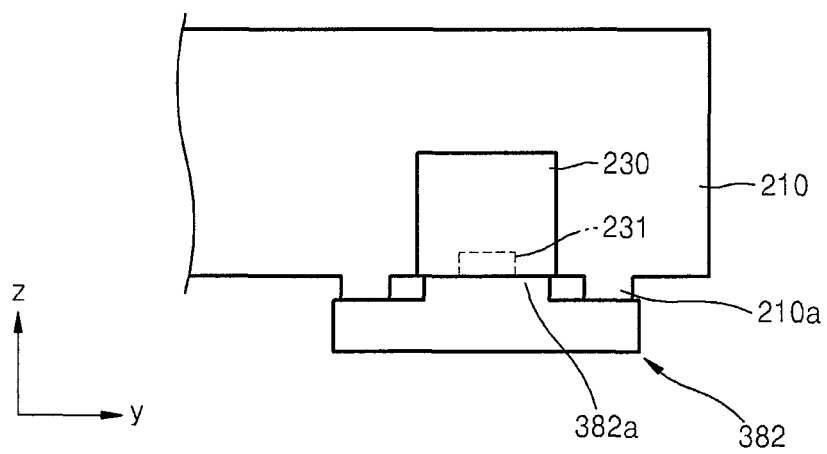

In the embodiment shown in FIGS. 9A and 9B, a switch unit 382 includes only a first protrusion 382a. The substrate 210 may further include a plurality of projections 210a in order to disperse a pressure. The projections 210a may disperse a pressure by contacting the switch unit 382. In FIGS. 9A and 9B, the projections 210a are formed in the substrate 210, but the present invention is not limited thereto. For example, the projections 210a may extend from the switch contact portion 230 or the protection circuit module 200 and contact the switch unit 382 so as to disperse a pressure.

Figure 10A:
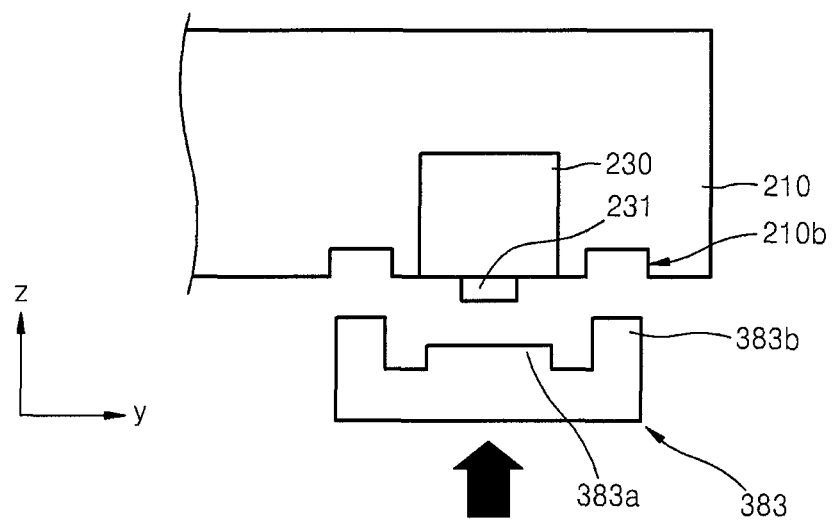
Figure 10B:
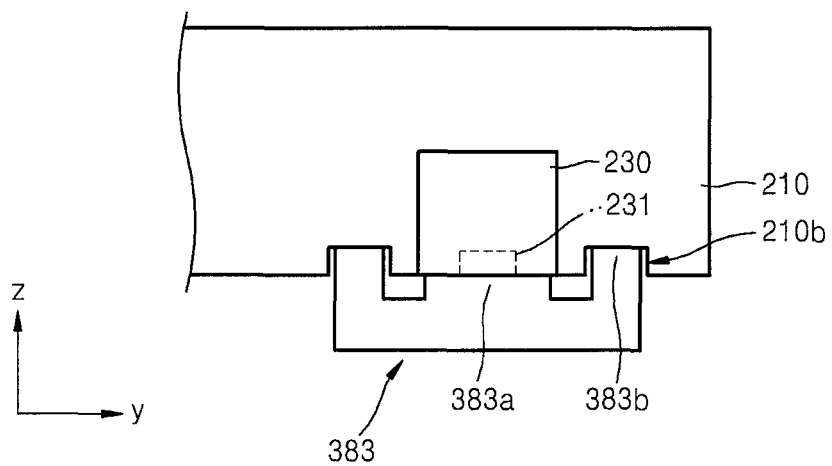

As shown in FIGS. 10A and 10B, a plurality of grooves 210b are formed in the substrate 210 so as to correspond to a plurality of second protrusions 383b of a switch unit 383. In one embodiment, the grooves 210b are also formed in portions of the protection circuit module 200 corresponding to the second protrusions 383b. In FIG. 10A, the grooves 210b formed in the substrate 210 may guide the second protrusions 383b. For example, a first protrusion 383a may be located to correspond to the switch button 231.

Figure 11A:
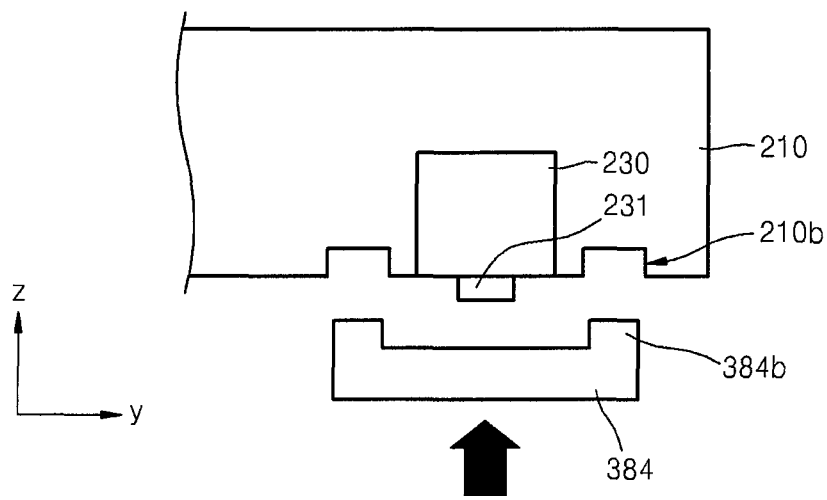
Figure 11B:
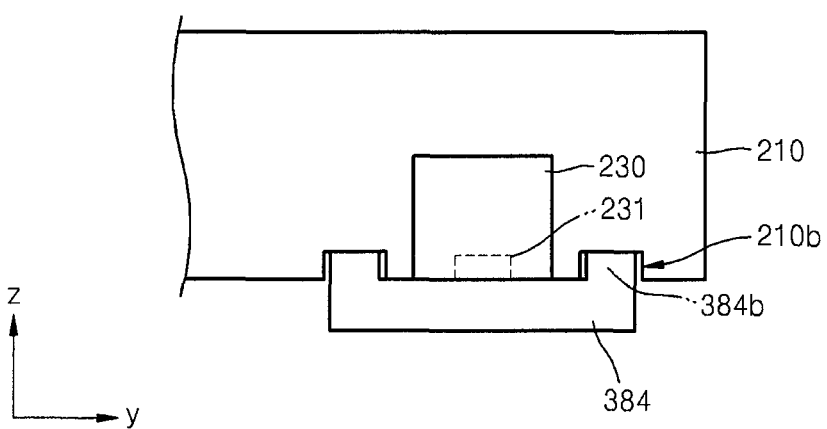

In the embodiment shown in FIGS. 11A and 11B, the grooves 210b are formed in the substrate 210 so as to correspond to a plurality of second protrusions 384b of a switch unit 384. An upper surface of the switch unit 384 may contact the switch button 231. The groove 210b may guide movement of the second protrusion 384b and may control the degree of the movement of the second protrusion 384b according to a depth of the groove 210b.

Figure 12A:
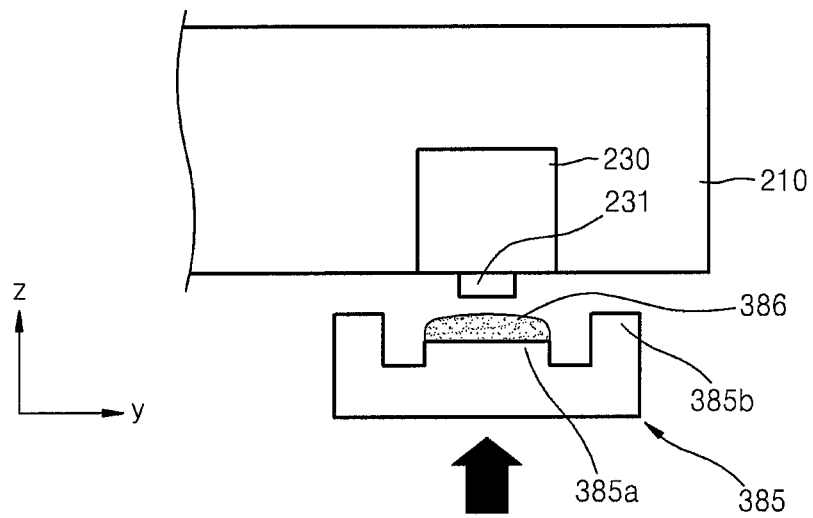
Figure 12B:
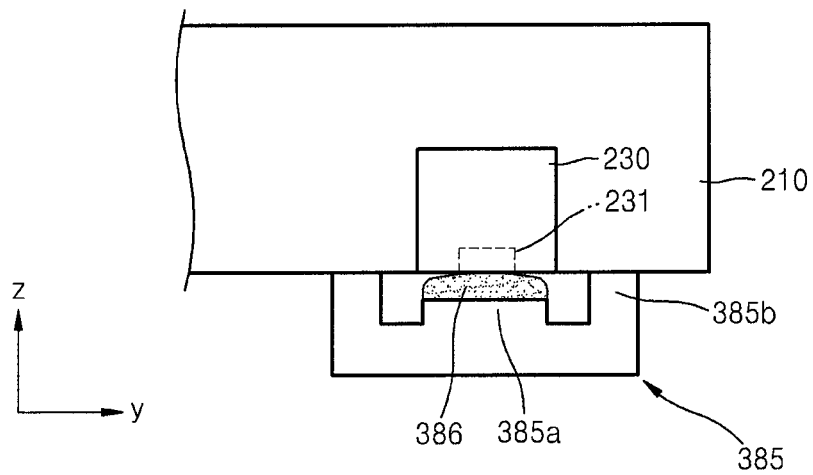

In the embodiment shown in FIGS. 12A and 12B, a first protrusion 385a of a switch unit 385 further includes an elastic portion 386. A plurality of second protrusions 385b of the switch unit 385 may disperse a pressure of the switch unit 385 to the substrate 210.

The elastic portion 386 may include a viscoelastic material. The viscoelastic material may improve contact between the switch unit 380 and the switch contact portion 230. Meanwhile, even though an excess force is applied to the switch unit 380, the viscoelastic material may prevent damage and separating of the switch unit 380 or the switch contact portion 230 by mitigating the applied force.

In a process of manufacturing the battery pack 1, the relative arrangement of the switch unit 380 and the switch contact portion 230 are not fixed. That is, the switch unit 380 may be located to not correspond to the switch contact portion 230 due to an error occurring in a process of accommodating the switch unit 380 in the frame 300 or a process of mounting the switch contact portion 230 on the substrate 210. The error may cause a bad connection of the switch unit 380, and thus a correct signal may not be generated by an operation of the switch unit 380. However, the error may be compensated by an elastic portion 386 formed on a side of the switch unit 380.

Figure 13A:
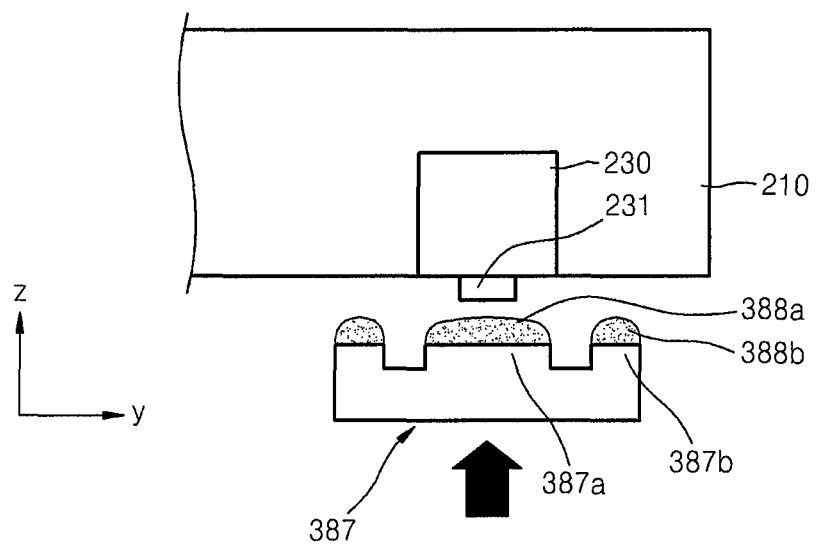
Figure 13B:
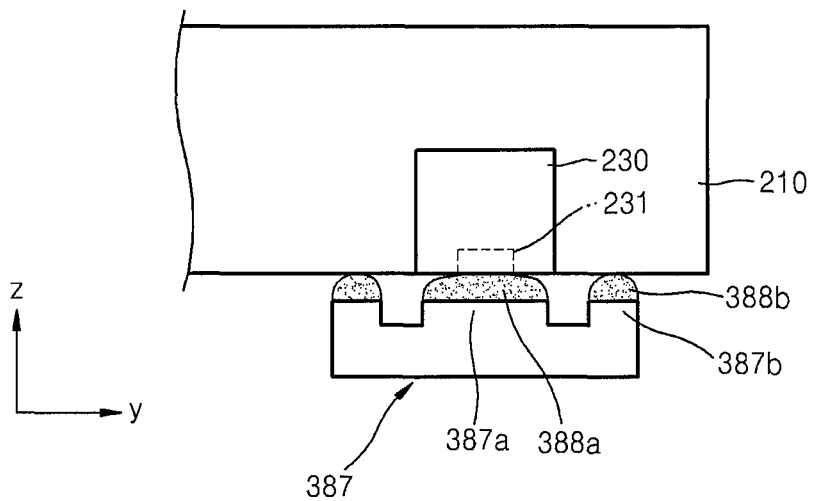

The position of the elastic portion 386 is not limited by the first protrusion 385a, which will be described with reference to FIGS. 13A and 13B. Elastic portions 388a and 388b may be formed on a first protrusion 387a and a plurality of second protrusions 387b, respectively. Although not shown in FIGS. 13A and 13B, the elastic portions 388a and 38b may be formed only on the second protrusions 387b.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A battery pack comprising:
   a core pack comprising a unit cell;
   a protection circuit module electrically connected to the core pack and comprising a switch contact portion;
   a frame accommodating the core pack and the protection circuit module, the frame comprising a switch unit corresponding to the switch contact portion; and
   a cover comprising a recessed portion covering at least a part of the core pack, facing the switch contact portion, and extending toward the protection circuit module,
   wherein the protection circuit module further comprises a substrate, wherein a first end portion of the substrate is supported by the frame, and a second end portion of the substrate is supported by the recessed portion of the cover.

2. The battery pack of claim 1, wherein the switch unit comprises:
   a first protrusion extending toward the switch contact portion; and
   a second protrusion spaced apart from the first protrusion at an interval.

3. The battery pack of claim 2, wherein the second protrusion surrounds the first protrusion.

4. The battery pack of claim 2, wherein a height of the second protrusion is equal to or greater than a height of the first protrusion.

5. The battery pack of claim 2, wherein the protection circuit module comprises a projection corresponding to the second protrusion.

6. The battery pack of claim 2, wherein the second protrusion further comprises an elastic portion at an end portion thereof.

7. The battery pack of claim 2, wherein the first protrusion further comprises an elastic portion at an end portion thereof.

8. The battery pack of claim 2, wherein a groove is formed in the protection circuit module so as to accommodate the second protrusion.

9. The battery pack of claim 1, wherein the cover comprises:
   a first cover located at a first side of the frame; and
   a second cover located at a second side of the frame.

10. A battery pack comprising:
    a core pack comprising a unit cell;
    a protection circuit module electrically connected to the core pack and comprising a switch contact portion;
    a frame accommodating the core pack and the protection circuit module; and
    a cover comprising a recessed portion covering at least a part of the core pack, facing the switch contact portion, and extending toward the protection circuit module,
    wherein the frame comprises a switch unit corresponding to the switch contact portion,
    wherein the cover further comprises:
      a first cover located at a first side of the frame; and
      a second cover located at a second side of the frame, and
    wherein the recessed portion extending toward the protection circuit module is formed in the first cover so as to correspond to the switch contact portion, and an aperture is formed in the second cover so as to correspond to the switch unit.

11. The battery pack of claim 1, wherein a width of the recessed portion is equal to or greater than a thickness of the substrate.

12. The battery pack of claim 11, wherein an end portion of the recessed portion comprises a first supporting frame and a second supporting frame, and the substrate is located between the first supporting frame and the second supporting frame.

13. The battery pack of claim 1, further comprising an insulating member located between the core pack and the cover.

14. The battery pack of claim 1, wherein the frame comprises high molecular weight compound.

15. The battery pack of claim 1, wherein the cover comprises a metal.

16. The battery pack of claim 1 further comprising a display unit for displaying a state of the core pack.

17. The battery pack of claim 1, wherein the unit cell comprises a polymer-type battery.

18. The battery pack of claim 1, wherein the battery pack is configured to be used in a portable computer.

* * * * *